(12) United States Patent
Kim et al.

(10) Patent No.: US 12,120,433 B2
(45) Date of Patent: Oct. 15, 2024

(54) ELECTRONIC DEVICE AND CONTROL METHOD THEREFOR (71) Applicant: SAMSUNG ELECTRONICS CO., LTD., Suwon-si (KR)

(72) Inventors: Hyunseok Kim, Suwon-si (KR); Sunwoo Kim, Suwon-si (KR); Jeongjun Oh, Suwon-si (KR); Yongsoo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 55 days.

(21) Appl. No.: 18/079,178

(22) Filed: Dec. 12, 2022

(65) Prior Publication Data

US 2023/0114046 A1 Apr. 13, 2023

Related U.S. Application Data (63) Continuation of application No. PCT/KR2021/003861, filed on Mar. 29, 2021.

(30) Foreign Application Priority Data

Jun. 26, 2020 (KR) .................. 10-2020-0078742

(51) Int. Cl.
H04N 21/45 (2011.01)
G06T 5/50 (2006.01)
H04N 5/262 (2006.01)
H04N 21/2665 (2011.01)
H04N 23/741 (2023.01)

(52) U.S. Cl.
CPC ............ H04N 23/741 (2023.01); G06T 5/50 (2013.01); G06T 2207/10024 (2013.01); G06T 2207/20208 (2013.01); G06T 2207/20221 (2013.01)

(58) Field of Classification Search
CPC ............... H04N 5/2624; H04N 5/2628; H04N 21/2665; H04N 21/44054; H04N 21/45; H04N 21/4622; G09G 2370/20
USPC ...................................... 348/333.01
See application file for complete search history.

(56) References Cited

U.S. PATENT DOCUMENTS 9,591,257 B2    3/2017  Oh et al.
9,928,020 B2    3/2018  Jang
10,963,998 B1*  3/2021  Baar .................. G09G 5/10
(Continued)

FOREIGN PATENT DOCUMENTS

JP   2013-217972 A   10/2013
JP   2017-174025 A    9/2017
(Continued)

OTHER PUBLICATIONS

International Search Report issued in International Application No. PCT/KR2021/003861 dated Jul. 9, 2021
(Continued)

Primary Examiner — Anthony J Daniels
(74) Attorney, Agent, or Firm — STAAS & HALSEY LLP (57) ABSTRACT An electronic device comprises: a plurality of scalers for processing respective images of a plurality of content received from a plurality of sources devices; and a processor configured to change information on whether at least one scaler of the plurality of scalers supports high dynamic range (HDR) when a request for simultaneously displaying the plurality of content is received.

15 Claims, 8 Drawing Sheets

(56) References Cited

U.S. PATENT DOCUMENTS

| | | | |
|---|---|---|---|
| 11,282,483 B2* | 3/2022 | Shih | G09G 5/005 |
| 11,330,120 B2 | 5/2022 | Aiba | |
| 11,496,798 B2* | 11/2022 | Walls | G06T 5/40 |
| 2007/0126712 A1 | 6/2007 | Park et al. | |
| 2009/0033619 A1 | 2/2009 | Oh | |
| 2014/0125696 A1* | 5/2014 | Newton | G11B 27/309 |
| | | | 345/629 |
| 2016/0044277 A1* | 2/2016 | Oh | H04N 21/4621 |
| | | | 386/230 |
| 2016/0125836 A1 | 5/2016 | Kim | |
| 2018/0336669 A1* | 11/2018 | Mertens | H04N 1/6027 |
| 2019/0080674 A1* | 3/2019 | Wyman | H04N 21/2343 |
| 2020/0314379 A1* | 10/2020 | Aoyama | H04N 5/44504 |

FOREIGN PATENT DOCUMENTS

| | | |
|---|---|---|
| JP | 2017-220690 A | 12/2017 |
| JP | 2018-129700 A | 8/2018 |
| JP | 2019-4334 A | 1/2019 |
| JP | 2020-25176 A | 2/2020 |
| KR | 10-1135901 B1 | 4/2012 |
| KR | 10-1465976 B1 | 11/2014 |
| KR | 10-2016-0026075 A | 3/2016 |
| KR | 10-2016-0050296 A | 5/2016 |
| KR | 10-1809967 B1 | 12/2017 |
| KR | 10-2019-0132072 A | 11/2019 |
| KR | 10-2120843 B1 | 6/2020 |
| KR | 10-0752838 B1 | 8/2022 |
| WO | WO 2019/209331 A1 | 10/2019 |

OTHER PUBLICATIONS

International Written Opinion iseued in International Application No. PCT/KR2021/003861 dated Jul. 9, 2021.

Korean Office Action dated Aug. 5, 2024 for Korean Patent Application No. 10-2020-0078742.

* cited by examiner

ELECTRONIC DEVICE AND CONTROL METHOD THEREFOR

CROSS-REFERENCE TO RELATED APPLICATION

This application is a continuation application, under 35 U.S.C. § 111(a), of international application No. PCT/KR2021/003861, filed on Mar. 29, 2021, which claims priority under 35 U. S. C. § 119 to Korean Patent Application No. 10-2020-0078742, filed on Jun. 26, 2020, the disclosures of which are incorporated herein by reference in their entirety.

BACKGROUND

Field

The disclosure relates to an electronic device and a control method therefor. More particularly, the disclosure relates to an electronic device which displays a plurality of content and a control method therefor.

Description of the Related Art

With recent developments in image processing technology and display devices, Ultra-HD (UHD) content of 3840×2160 resolution and further to 8K content of 7680×4320 resolution and display devices which can playback the content above are being supplied.

Specifically, display devices may display a high solution content, and also simultaneously display a plurality of low-resolution content. For example, the display device may display a UHD content of 3840×2160 resolution, but may also display four Full HD (FHD) content of 1920×1080 resolution in a matrix form. In case of the latter, the display device may output four FHD content at 3840×2160 resolution, and this operation may be referred to as a picture by picture (PBP) function.

Figure 1A:
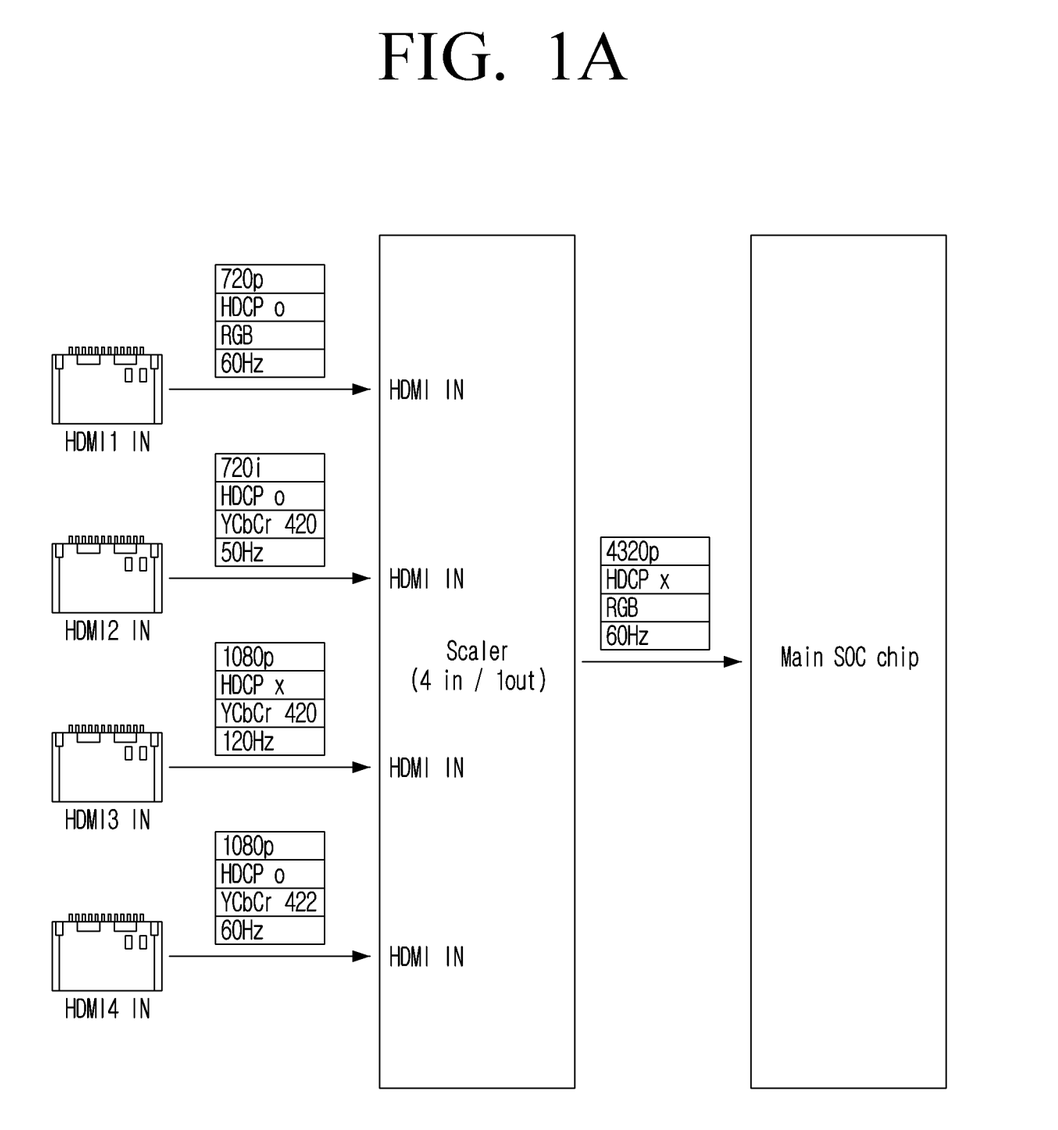
FIG. 1A and FIG. 1B are diagrams for illustrating related art.

The PBP function of the related art could output content of four FHD or less resolution to the UHD resolution. At this time, as shown in FIG. 1A, four scalers performed image processing for sizes of four respective contents to be same, and one scaler of a rear end of the four scalers merged the four image processed content. For example, each of first and second scalers from among the four scalers may image process content of 1280×720 resolution to content of 1920×1080 resolution. That is, the four scalers performed image processing for sizes of four contents to be the same based on not only resolution information, but also high-bandwidth digital content protection (HDCP) information, color gamut information, frame rate information, and the like.

Figure 1B:
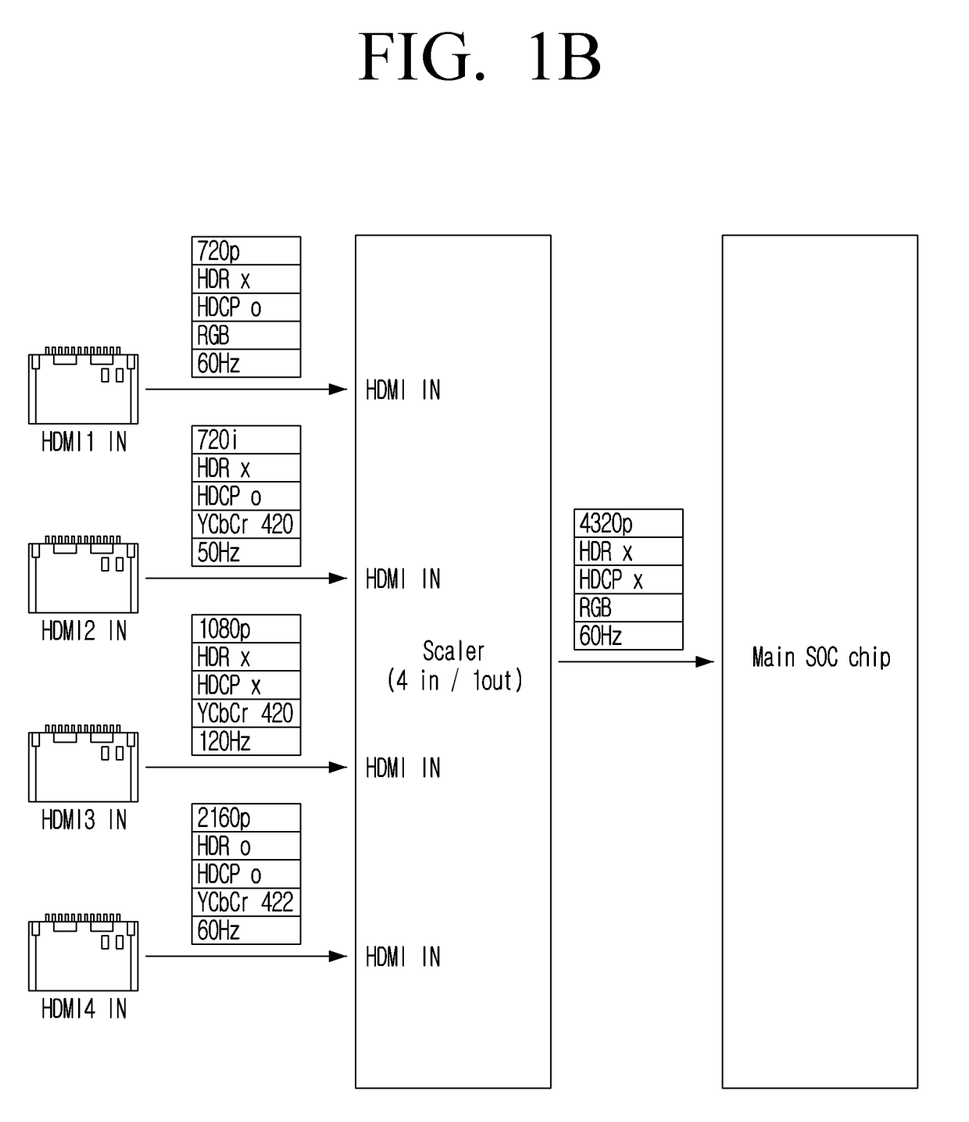

However, with recent developments on image transmission sizes, transmission of UHD content has become possible, and additionally, as shown in FIG. 1B, information on whether to support high dynamic range (HDR) of each content may be transmitted. Here, dynamic range (DR) may mean a range from a brightest portion to a darkest portion, and HDR may mean a technology which expands a range of brightness such that the image is close to a person seeing with the naked eye by making a bright spot brighter and a dark spot darker in a digital image.

Unlike the resolution, the HDCP, the color gamut, the frame rate, and the like, it is not possible for the scaler to perform image processing of changing whether to support HDR. That is, according to the related art, whether to support HDR of the plurality of content cannot be changed identically, and if the plurality of content of which whether to support HDR is different is displayed in the PBP form, there is a problem of a processing error occurring. For example, the merged image of FIG. 1B is output in a form which is not HDR supported, and in this case, there is a problem of an error occurring in an output process of the content which is HDR supported.

SUMMARY

According to an embodiment, an electronic device includes a plurality of scalers configured to perform image processing of a plurality of content received from a plurality of source devices, respectively, and a processor configured to change, based on a request for simultaneously displaying the plurality of content being received, information on whether to support high dynamic range (HDR) of at least one scaler among the plurality of scalers.

The information on whether to support HDR may be included in Extended Display Identification Data (EDID) information of a corresponding scaler among the plurality of scalers.

The processor may be configured to change the information on whether to support HDR of the at least one scaler among the plurality of first scalers to an HDR unsupported state.

The electronic device may further include a communication interface, and the processor may be configured to control the communication interface to transmit updated EDID information of each of the plurality of scalers to a corresponding source device among the plurality of source devices by changing to the HDR unsupported state.

The EDID information may be stored in an internal memory of the plurality of scalers respectively, or stored in an external memory outside of the plurality of scalers.

The plurality of scalers may be a plurality of first scalers and the electronic device may further include a second scaler, and the processor may be configured to control the plurality of first scalers to perform image processing of the plurality of content received from the plurality of source devices based on size information that is same, and control the second scaler to merge the plurality of content which is image processed by the plurality of first scalers.

The size information may include at least one from among resolution information, HDR information, high-bandwidth digital content protection (HDCP) information, color gamut information, or frame rate information.

The request for simultaneously displaying the plurality of content may include a user request for displaying the plurality of content in a picture by picture (PBP) form.

The processor may be configured to change, based on a request for simultaneously displaying the plurality of content being received and the information on whether to support HDR of the plurality of content being different, the information on whether to support HDR of the at least one scaler among the plurality of first scalers.

The electronic device and each of the plurality of source devices may be connected to a size of High-Definition Multimedia Interface (HDMI) 2.1.

According to an embodiment a control method of an electronic device includes receiving a plurality of content from a plurality of source devices, and changing, based on a request for simultaneously displaying the plurality of content being received, information on whether to support high dynamic range (HDR) of at least one scaler among a plurality of scalers included in the electronic device.

The information on whether to support HDR may be included in Extended Display Identification Data (EDID) information of a corresponding scaler among the plurality of scalers.

The changing may include changing the information on whether to support HDR of the at least one scaler among the plurality of first scalers to an HDR unsupported state.

The control method may further include transmitting updated EDID information of each of the plurality of scalers to a corresponding source device among the plurality of source devices by changing to the HDR unsupported state.

The EDID information may be stored in an internal memory of the plurality of scalers respectively, or stored in an external memory outside of the plurality of scalers.

The control method may further include performing image processing of the plurality of content received from the plurality of source devices through the plurality of scalers based on size information that is same and merging the plurality of content which is image processed by the plurality of scalers through a second scaler included in the electronic device.

The size information may include at least one from among resolution information, HDR information, high-bandwidth digital content protection (HDCP) information, color gamut information, or frame rate information.

The command for simultaneously displaying the plurality of content may include a user command for displaying the plurality of content in a picture by picture (PBP) form.

The changing operation may include changing, based on the request for simultaneously displaying the plurality of content being received and the information on whether to support HDR of the plurality of content being different, the information on whether to support HDR of at least one scaler among the plurality of scalers.

The electronic device and each of the plurality of source devices may be connected to a size of High-Definition Multimedia Interface (HDMI) 2.1.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The disclosure will be described in detail below with reference to the accompanying drawings.

Terms used in describing the embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

The expression at least one of A and/or B is to be understood as indicating any one of "A" or "B" or "A and B."

The expressions such as "first," "second," "1st," "2nd," and so on used herein may be used to refer to various elements regardless of order and/or importance, and it should be noted that the expressions are merely used to distinguish an element from another element and not to limit the relevant elements.

A singular expression includes a plural expression, unless otherwise specified. It is to be understood that the terms such as "configured" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

In this disclosure, the term "user" may refer to a person using an electronic device or a device (e.g., artificial intelligence electronic device) using an electronic device.

The various embodiments of the disclosure will be described in greater detail below with reference to the accompanied drawings.

Aspects of the disclosure are to address at least the above-mentioned problems and/or disadvantages and an object of the disclosure is to provide an electronic device which changes a size of a plurality of content to be same for display and a control method therefor.

According to various embodiments of the disclosure as described above, an electronic device may change a size of a plurality of content to be same according to information on whether to support a high dynamic range (HDR) of at least one from among a plurality of first scalers being changed, and provide an image of uniform quality to a user based on simultaneously displaying the plurality of content of a same size.

Figure 2A:
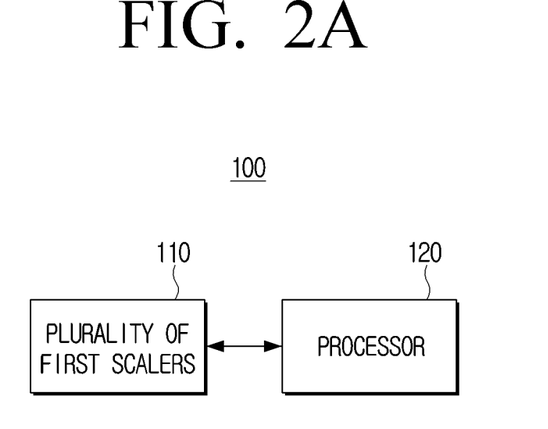
FIG. 2A is a block diagram illustrating a hardware configuration of an electronic device according to an embodiment of the disclosure.

FIG. 2A is a block diagram illustrating a hardware configuration of an electronic device 100 according to an embodiment of the disclosure.

The electronic device 100 may be a device which performs image processing of a plurality of content, and may be device which does not include a display such as a set top box (STB) or a main frame of a computer, and provides image processed content to a display device after performing only the image processing.

Alternatively, the electronic device 100 may be a device which includes a display such as, for example, and without limitation, a television (TV), a desktop personal computer (PC), a notebook, a video wall, a large format display (LFD), a digital signage, a digital information display (DID), a projector display, a digital video disk (DVD) player, a smartphone, a tablet PC, a monitor, smart glasses, a smart watch, and the like, and which directly displays the image processed content.

However, the embodiment is not limited thereto, and the electronic device 100 may be any device as long as it is a device which can perform image processing of the plurality of content.

Referring to FIG. 2A, the electronic device 100 may include a plurality of first scalers 110 and a processor 120. However, the embodiment is not limited thereto, and the electronic device 100 may be implemented to a form in which some configurations are excluded.

The plurality of first scalers 110 may perform image processing of the plurality of content received from a plurality of source devices respectively. For example, each of the plurality of first scalers 110 may change a resolution of a content by a control of the processor 120. However, the embodiment is not limited thereto, and there is no specific limitation to image processing.

Here, each of the plurality of source devices may be connected with the electronic device 100 to a size of High-Definition Multimedia Interface (HDMI) 2.1. Accordingly, each of the plurality of source devices may provide information on a content of UHD resolution and whether to support high dynamic range (HDR) to the electronic device 100. However, the embodiment is not limited thereto, and as long as information on whether to support HDR is provided, it may be any size.

The plurality of first scalers 110 may perform image processing of the plurality of content received from the plurality of source devices based on same size information. Here the size information may include at least one from among resolution information, HDR information, high-bandwidth digital content protection (HDCP) information, color gamut information, or frame rate information. For example, the plurality of first scalers 110 may perform image processing of the plurality of content so that the plurality of content received from the plurality of source devices is output to a same size. That is, the image processed plurality of content which is output from the plurality of first scalers 110 may be such that the resolution information, the HDR information, the high-bandwidth digital content protection (HDCP) information, the color gamut information, and the frame rate information are all the same.

The processor 120 may control the overall operation of the electronic device 100. Specifically, the processor 120 may be connected with each configuration of the electronic device 100 and control the overall operation of the electronic device 100. For example, the processor 120 may be connected with the plurality of first scalers 110 and control an operation of the electronic device 100.

The processor 120 according to an embodiment may be implemented as a digital signal processor (DSP), a microprocessor, or a time controller (TCON). However, the embodiment is not limited thereto, and may include one or more from among a central processing unit (CPU), a micro controller unit (MCU), a micro processing unit (MPU), a controller, an application processor (AP), a communication processor (CP), or an ARM processor, or may be defined by the corresponding term. In addition, the processor 120 may be implemented as a System on Chip (SoC) or a large scale integration (LSI) in which a processing algorithm is embedded, and may be implemented in the form of a field programmable gate array (FPGA).

The processor 120 may change, based on a command for simultaneously displaying the plurality of content being received, information on whether to support high dynamic range (HDR) of at least one from among the plurality of first scalers 110.

The processor 120 may change, based on the command for simultaneously displaying the plurality of content being received, information on whether to support HDR of at least one from among the plurality of first scalers 110 to HDR not supported state. For example, the processor 120 may change the information on whether to support HDR of remaining first scalers excluding the first scaler in the HDR supported state from among the plurality of first scalers 110 to the HDR not supported state.

Here, the information on whether to support HDR may be included in Extended Display Identification Data (EDID) information of a corresponding first scaler, and the EDID information may be stored in each internal memory of the plurality of first scalers 110, or stored in an external memory outside of the plurality of first scalers 110.

The processor 120 may transmit EDID information of each of the updated plurality of first scalers 110 to a corresponding source device by changing to the HDR not supported state. In this case, each of the plurality of source devices which provide the plurality of content may provide content which is not HDR supported to the electronic device 100 because the corresponding first scaler does not support HDR. Through the operation described above, the electronic device 100 may receive the plurality of content which is not HDR supported, and there is no error occurring even if the received content is simultaneously displayed.

The command for simultaneously displaying the plurality of content may include a user command for displaying the plurality of content in a picture by picture (PBP) form. That is, the processor 120 may change, based on a user command for displaying the plurality of content in the PBP form being received, information on whether to support HDR of at least one from among the plurality of first scalers 110 to the HDR not supported state and guide for the plurality of sources devices to transmit the plurality of content which is not HDR supported.

Alternatively, the processor 120 may change, based on the command for simultaneously displaying the plurality of content being received, and the information on whether to support HDR of the plurality of content being different, information on whether to support HDR of at least one from among the plurality of first scalers 110. For example, the processor 120 may change, based on the command for simultaneously displaying the plurality of content being received, and at least a portion from among the plurality of content supporting HDR and the remaining not supporting HDR, the information on whether to support HDR of at least one from among the plurality of first scalers 110. Here, the at least one first scaler to change the information on whether to support HDR may be the first scaler which performs image processing of the HDR supported content.

The processor 120 may change the information on whether to support HDR only when there is concern of a problem occurring through the operation described above. That is, when the plurality of content all support HDR or not support HDR at all, the user may not experience a different sense even if the plurality of content is provided in the PBP form, and accordingly, it may not be necessary for the processor 120 to change the information on whether to support HDR.

The processor 120 may control the plurality of first scalers 110 to perform image processing of the plurality of content received from the plurality of source devices based on the same size information. That is, the processor 120 may control the plurality of first scalers 110 for the plurality of content to be image processed such that the resolution information, the HDR information, the HDCP information, the color gamut information, and the frame rate information are all image processed identically.

Then, the processor 120 may merge the image processed plurality of content through a second scaler which will be described below.

The processor 120 may restore, based on a release command for the operation of simultaneously displaying the plurality of content being received, an updated EDID of the plurality of first scalers 110, and transmit the restored EDID to the corresponding source device.

Through the operation described above, the processor 120 may perform image processing for the size information of the plurality of content to be the same. Specifically, a problem of image processing not being possible due to the plurality of first scalers 110 changing whether to support HDR may be bypassed through a method of updating the EDID and receiving content which is not HDR supported.

Figure 2B:
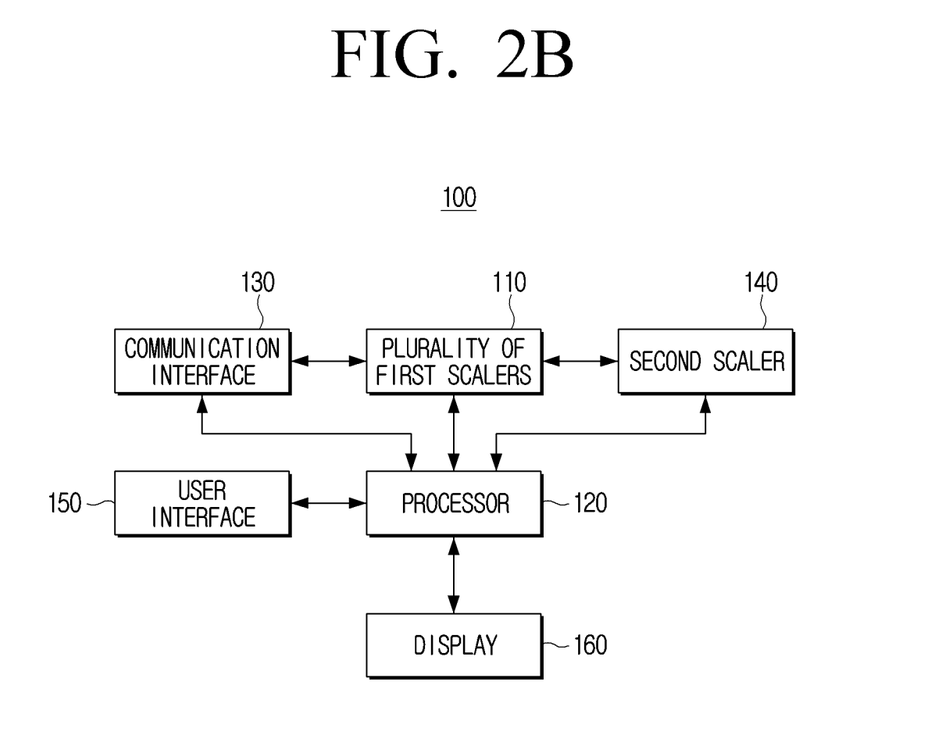
FIG. 2B is a block diagram illustrating a detailed configuration of an electronic device according to another embodiment of the disclosure.

FIG. 2B is a block diagram illustrating a detailed configuration of the electronic device 100 according to another embodiment of the disclosure. The electronic device 100 may include the plurality of first scalers 110 and the processor 120. In addition, as shown in FIG. 2, the electronic device 100 may further include a communication interface 130, a second scaler 140, a user interface 150, and a display 160. The processor 120 may be connected with the communication interface 130, the second scaler 140, the user interface 150, and the display 160 and control the operations of each configuration. Detailed description of parts that overlap with the elements shown in FIG. 2A from among the elements shown in FIG. 2B will be omitted.

The communication interface 130 may be a configuration for performing communication with various devices. For example, the communication interface 130 may support various wired communication methods such as, for example, and without limitation, HDMI, MHL, USB, RGB, D-SUB, DVI, and the like. In addition, the communication interface 130 may support various wireless communication methods such as, for example, and without limitation, Bluetooth, Bluetooth Low Energy (BLE), Wireless Fidelity (WI-FI), Zigbee and the like. However, the embodiment is not limited thereto, and it may be any method so long as it is a communication standard which can communicate with other external devices.

The processor 120 may receive the plurality of content from the plurality of source devices through the communication interface 130. In addition, the processor 120 may control the communication interface 130 to transmit EDID information of each of the updated plurality of first scalers 110 to the corresponding source device.

The second scaler 140 may merge the plurality of content image processed by the plurality of first scalers 110. For example, the second scaler 140 may arrange four UHD content of 3840×2160 resolution which is image processed and output by the four first scalers 110 to 2×2 and output to 7680×4320 resolution.

The user interface 150 may be a configuration for receiving various control commands, and may be implemented to various forms according to an embodiment of the electronic device 100. For example, the user interface 150 may be a button provided at the electronic device 100, a microphone which receives a user voice, a camera which detects a user motion, and the like. Alternatively, the electronic device 100 may receive a control command from a remote control device, and in this case, the communication interface 130 may perform the role of the user interface 150. Alternatively, in case the electronic device 100 is implemented as a touch based terminal device, the user interface 150 may be implemented in a form of a touch screen which forms an inter-layer structure with a touch pad. In this case, the user interface 150 may also be used as a display 160 which will be described below.

The display 160 may be implemented as a display of various forms such as, for example, and without limitation, a liquid crystal display (LCD), an organic light emitting diode (OLED) display, a plasma display panel (PDP), or the like. In the display 160, a driving circuit which may be implemented in the form of an a-si TFT, a low temperature poly silicon (LTPS) TFT, or the like, a backlight unit, and the like may be included. The display 160 may be implemented as a touch screen coupled with a touch sensor, a flexible display, a three-dimensional display (3D display), or the like.

The processor 120 may control the display 160 to display merged content.

Though the method described above, the user may not experience a different sense even if the plurality of content is provided in the PBP form.

An operation of the electronic device 100 will be described in greater detail below through FIG. 2 to FIG. 5. In FIG. 2 to FIG. 5, separate embodiments will be described for convenience of description. However, the separate embodiments of FIG. 2 to FIG. 5 may be realized in any combined state.

Figure 3:
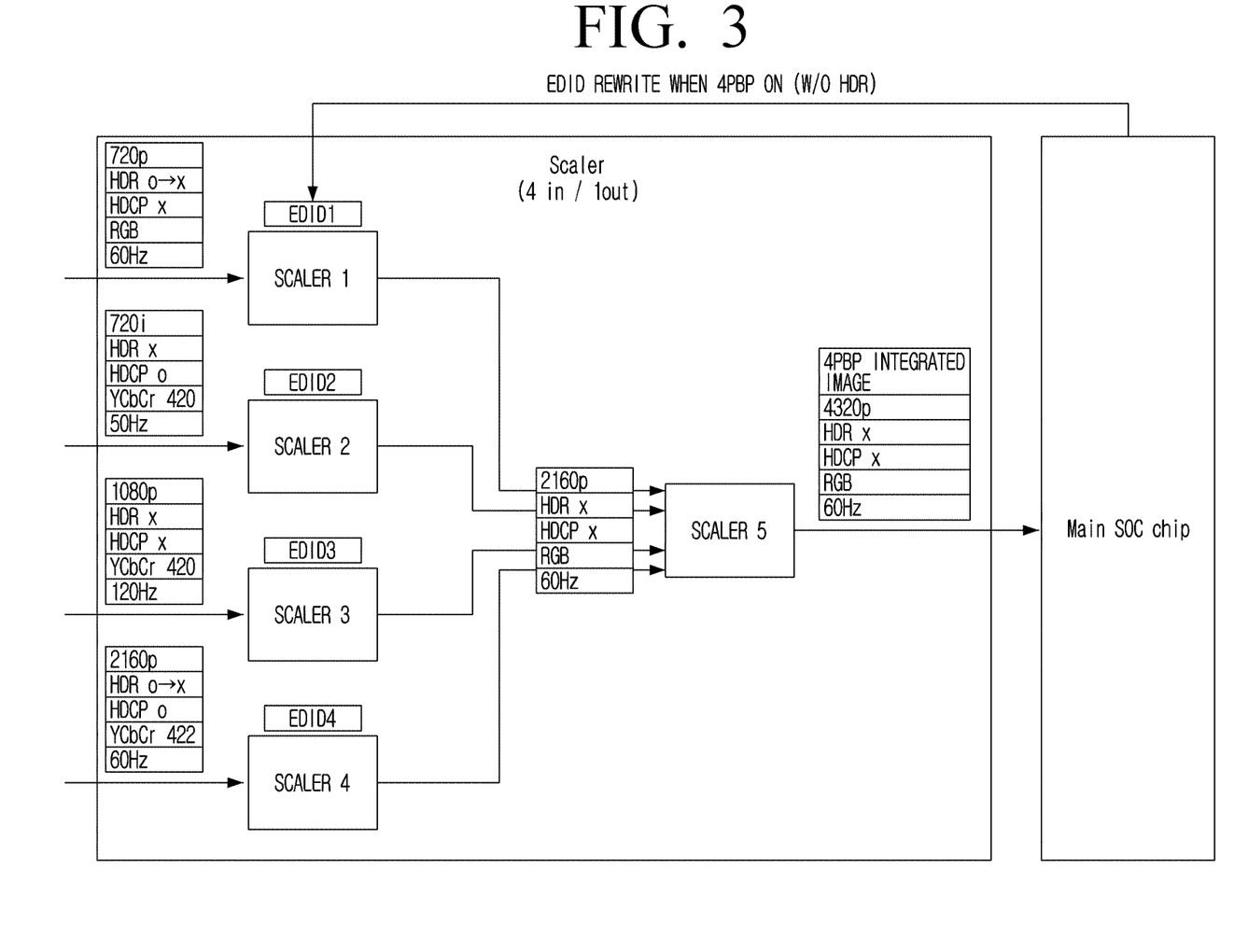
FIG. 3 is a diagram illustrating an update process of EDID according to an embodiment of the disclosure.

FIG. 3 is a diagram illustrating an update process of the EDID according to an embodiment of the disclosure.

First, the plurality of first scalers 110 (Scaler 1 to Scaler 4) may be four scalers, and each scaler has been assumed as receiving content of different sizes. Specifically, the information on whether to support HDR of the plurality of content is different.

Each of the plurality of first scalers 110 may store corresponding EDID information, and the EDID information may be transmitted to the corresponding source device. Each of the plurality of source devices may provide content based on the received EDID information.

The processor 120 may control one from among the plurality of first scalers 110 to perform image processing of only one from among the plurality of content if the command for simultaneously displaying the plurality of content is not yet received. For example, in the case of FIG. 3, there are four external inputs, and the processor 120 may control the first scaler (Scaler 4) to perform image processing of a content which is provided from an external input selected by a user from among the four external inputs. In this case, the second scaler 140 may not perform any operation because there is no need to perform the merge process.

However, the embodiment is not limited thereto, and the whole of the plurality of first scalers 110 may not perform any operation, and the second scaler 140 may perform the image processing. For example, the whole of the plurality of first scalers 110 may not perform any operation, and the second scaler 140 may perform image processing of the content which is provided from an external input selected by the user.

Then, the processor 120 may change, based on the command for simultaneously displaying the plurality of content being received, information on whether to support HDR of at least one from among the plurality of first scalers 110 to the HDR not supported state.

For example, according to FIG. 3, the EDID of the first scaler (Scalers 1 and 4) may include the HDR supported state information, and the EDID of the first scaler (Scalers 2 and 3) may include the HDR not supported state information. Then, the processor 120 may change, based on the command for simultaneously displaying the plurality of content being received, the HDR supported state information from the EDID of the first scaler (Scalers 1 and 4) to the HDR not supported state.

Then, the processor 120 may transmit the updated EDID information to the corresponding source device. In the above-described example, the processor 120 transmitted each of the updated EDID information of the first scaler (Scalers 1 and 4) to the corresponding source device. However, the embodiment is not limited thereto, and the processor 120 may transmit all EDID information to the corresponding source device if there is an update of a portion of EDID regardless of whether the EDID information is updated.

The source device which received the updated EDID information may provide content to the electronic device 100 based on the updated EDID information. For example, if the EDID information is updated from the HDR supported state to the HDR not supported state, the source device may transmit content which is not HDR supported to the electronic device 100.

Through the operation described above, the electronic device 100 may receive content which is not HDR supported from all source devices, and output content of uniform quality with respect to HDR.

Then, the processor 120 may restore, based on the release command for the operation of simultaneously displaying the plurality of content being received, the updated EDID, and transmit the restored EDID to the corresponding source device. In the above-described example, the processor restored the updated EDID information of the first scaler (Scalers 1 and 4), and transmitted the restored EDID information to the corresponding source device. In this case, the source device which received the updated EDID information may provide content to the electronic device 100 based on the updated EDID information. For example, if the EDID information is updated from the HDR not supported state to the HDR supported state, the source device may transmit HDR supported content to the electronic device 100.

However, the embodiment is not limited thereto, and the processor 120 may restore only the EDID of the first scaler which performs image processing of the content which is provided from the external input selected by the user from among the four external inputs before the command for simultaneously displaying the plurality of content is received. In the above-described example, the processor 120 may restore only the EDID of the first scaler (Scaler 4).

Figure 4:
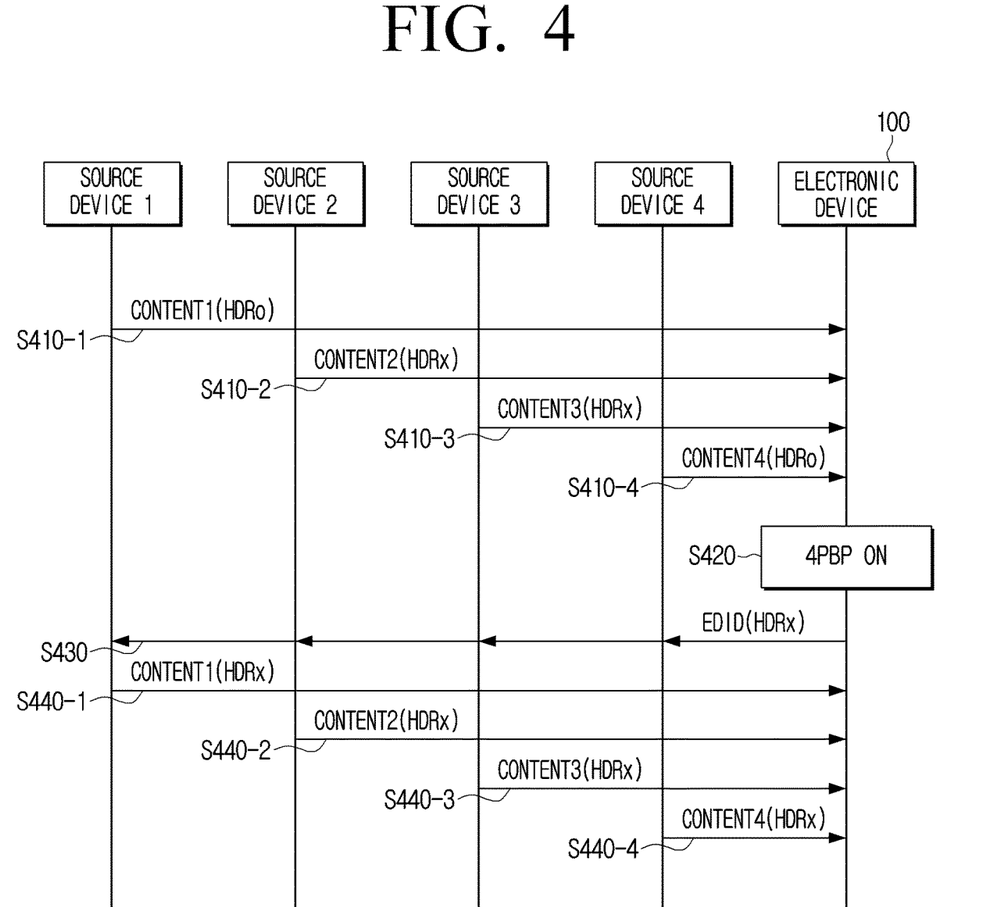
FIG. 4 is a sequence diagram illustrating an operation of an electronic system according to an embodiment of the disclosure.

FIG. 4 is a sequence diagram illustrating an operation of an electronic system according to an embodiment of the disclosure.

Source devices 1 to 4 may each transmit content to the electronic device 100 (S410-1 to S410-4). At this time, the content transmitted by each of source devices 1 to 4 may be different in terms of whether to support HDR. For example, as shown in FIG. 4, source device 1 and source device 4 may transmit HDR supported content to the electronic device 100, and source device 2 and source device 3 may transmit HDR not supported content to the electronic device 100.

Then, the electronic device 100 may receive the command for simultaneously displaying the plurality of content (S420). For example, as shown in FIG. 4, the electronic device 100 may receive a user command (4PBP ON) for displaying the plurality of content in the PBP form.

The electronic device 100 may change the information on whether to support HDR included in at least one EDID information from among the plurality of first scalers 110 included in the electronic device 100 to the HDR not supported state according to the user command.

The electronic device 100 may transmit the updated EDID information to source devices 1 to 4 (S430). In FIG. 4, although the electronic device 100 is shown as transmitting the updated EDID information to source devices 1 to 4, the embodiment is not limited thereto. For example, the electronic device 100 may transmit the updated EDID information to only the source devices which do not require the content to be changed according to the updated EDID information.

Source devices 1 to 4 may transmit content which is not HDR supported to the electronic device 100 based on the updated EDID information (S440-1 to S440-4).

Figure 5:
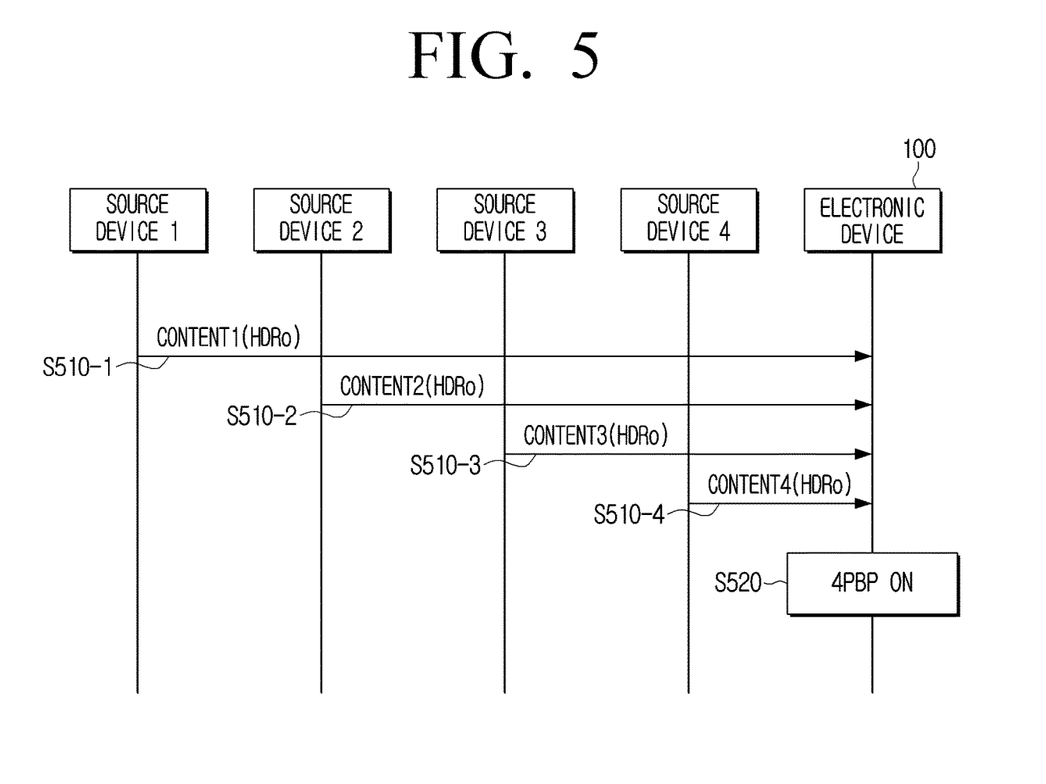
FIG. 5 is a sequence diagram illustrating an operation of an electronic system according to another embodiment of the disclosure.

FIG. 5 is a sequence diagram illustrating an operation of the electronic system according to another embodiment of the disclosure.

Source devices 1 to 4 may each transmit content to the electronic device 100 (S510-1 to S510-4). At this time, the content transmitted by each of source devices 1 to 4 may be in the HDR supported state. The above is based on assuming that the EDID information of the plurality of first scalers 110 included in the electronic device 100 include the HDR supported state information, and the content which is to be transmitted by source devices 1 to 4 is in the HDR supported state.

Then, the electronic device 100 may receive the command for simultaneously displaying the plurality of content (S520). For example, as shown in FIG. 5, the electronic device 100 may receive the user command (4PBP ON) for displaying the plurality of content in the PBP form.

The electronic device 100 may identify whether each content supports HDR based on metadata of the content which is received from source devices 1 to 4. Then, the electronic device 100 may not perform any operation based on all of the plurality of content being identified as supporting HDR. This is because the user may not experience a different sense because all content is output in the HDR supported state even if the plurality of content is displayed in the PBP form.

In FIG. 5, the content transmitted by each of source devices 1 to 4 is assumed as in the HDR supported state, but is not limited thereto. For example, the content transmitted by each of source devices 1 to 4 may be in the HDR not supported state. This is because the EDID information of the plurality of first scalers 110 included in the electronic device 100 includes the HDR not supported state information. Alternatively, even if the EDID information of the plurality of first scalers 110 included in the electronic device 100 includes the HDR supported state information, the content to be transmitted by source devices 1 to 4 is in the HDR not supported state.

Then, the electronic device 100 may receive the command for simultaneously displaying the plurality of content, but may not perform any operation if all of the plurality of content is identified as not supporting HDR. Likewise, the user may not experience a different sense because all content is output in the HDR not supported state even if the plurality of content is displayed in the PBP form.

That is, the electronic device 100 may change, based on the command for simultaneously displaying the plurality of content being received as shown in FIG. 4, the information on whether to support HDR of the plurality of first scalers 110 included in the electronic device 100 to the HDR not supported state.

Alternatively, the electronic device 100 may first identify, based on the command for simultaneously displaying the plurality of content being received as shown in FIG. 5, if information on whether to support HDR of the plurality of content is the same, and may not perform any operation if the above is all the same. That is, the electronic device 100 may change the information on whether to support HDR of the plurality of first scalers 110 included in the electronic device 100 to the HDR not supported state only when information on whether to support HDR of the plurality of content is different.

Figure 6:
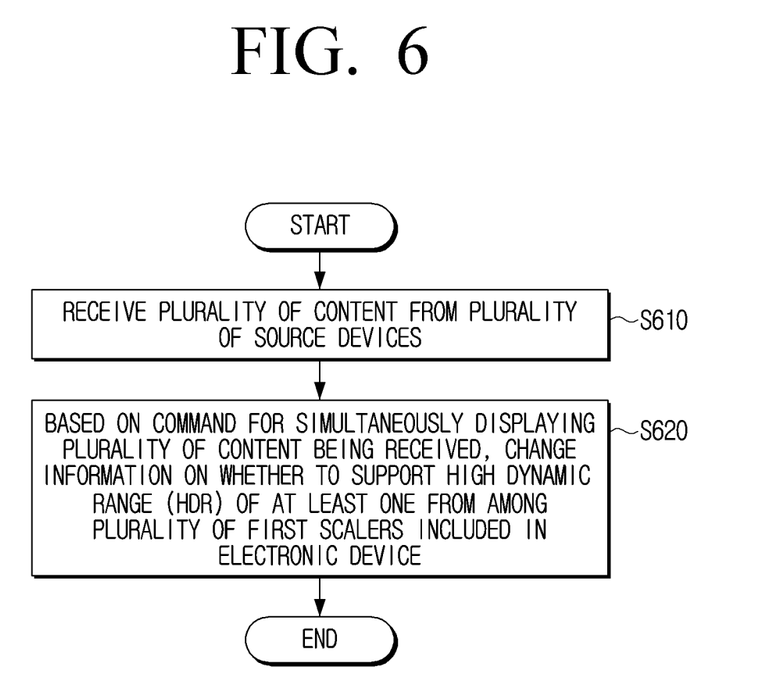
FIG. 6 is a flowchart illustrating a control method of an electronic device according to an embodiment of the disclosure.

FIG. 6 is a flowchart illustrating a control method of an electronic device according to an embodiment of the disclosure.

First, the plurality of content may be received from the plurality of source devices (S610). Then, based on the command for simultaneously displaying the plurality of content being received, information on whether to support high dynamic range (HDR) of at least one from among the plurality of first scalers included in the electronic device may be changed (S620).

Here, the information on whether to support HDR may be included in the Extended Display Identification Data (EDID) information of the corresponding first scaler.

Then, the changing (S620) may change the information on whether to support HDR of at least one from among the plurality of first scalers to the HDR not supported state.

In addition, by changing to the HDR not supported state, the updated EDID information of each of the plurality of first scalers is transmitted to the corresponding source device may be further included.

The EDID information may be stored in an internal memory of the plurality of first scalers respectively, or stored in an external memory outside of the plurality of first scalers.

Further, image processing of the plurality of content received from the plurality of source devices through the plurality of first scalers based on the same size information and merging the plurality of content which is image processed by the plurality of first scalers through the second scaler may be included in the electronic device.

Here, the size information may include at least one from among the resolution information, the HDR information, the high-bandwidth digital content protection (HDCP) information, the color gamut information, or the frame rate information.

The command for simultaneously displaying the plurality of content may include the user command for displaying the plurality of content in the picture by picture (PBP) form.

Then, the changing (S620) may change, based on the command for simultaneously displaying the plurality of content being received, and the information on whether to support HDR of the plurality of content being different, the information on whether to support HDR of at least one from among the plurality of first scalers.

The electronic device and each of the plurality of source devices may be connected to a size of the High-Definition Multimedia Interface (HDMI) 2.1.

According to the various embodiments of the disclosure as described above, the electronic device may provide the user with an image of a uniform quality by changing the information on whether to support high dynamic range (HDR) of at least one from among the plurality of first scalers, and simultaneously displaying the plurality of content of the same size.

According to an embodiment, the various embodiments described above may be implemented with software including instructions stored in a machine-readable storage media (e.g., computer). The machine may call an instruction stored in the storage medium, and as a device capable of operating according to the called instruction, may include an electronic device (e.g., electronic device A) according to the above-mentioned embodiments. Based on the instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

In addition, according to an embodiment, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least stored temporarily in a server of a manufacturer, a server of an application store, or a storage medium such as a memory of a relay server, or temporarily generated.

In addition, each of the elements (e.g., a module or a program) according to various embodiments may be configured of a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by the respective corresponding elements prior to integration. Operations performed by a module, a program, or other element, in accordance with various embodiments, may be executed sequentially, in parallel, repetitively, or in a heuristically manner, or at least some operations may be performed in a different order, omitted, or a different operation may be added.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic device, comprising:
 a plurality of scalers configured to perform image processing of a plurality of content received from a plurality of source devices, respectively; and
 a processor configured to change, based on a request for simultaneously displaying the plurality of content being received, information on whether to support high dynamic range (HDR) of at least one scaler among the plurality of scalers.

2. The electronic device of claim 1, wherein the information on whether to support HDR is comprised in Extended Display Identification Data (EDID) information of a corresponding scaler among the plurality of scalers.

3. The electronic device of claim 2, wherein the processor is configured to:
change the information on whether to support HDR of the at least one scaler among the plurality of scalers to an HDR unsupported state.

4. The electronic device of claim 3, further comprising:
a communication interface,
wherein the processor is configured to control the communication interface to transmit updated EDID information of each of the plurality of scalers to a corresponding source device among the plurality of source devices by changing to the HDR unsupported state.

5. The electronic device of claim 2, wherein the EDID information is stored in an internal memory of the plurality of scalers respectively, or stored in an external memory outside of the plurality of scalers.

6. The electronic device of claim 1, wherein the plurality of scalers are a plurality of first scalers and the electronic device further comprises:
a second scaler,
wherein the processor is configured to,
control the plurality of first scalers to perform image processing of the plurality of content received from the plurality of source devices based on size information that is same, and
control the second scaler to merge the plurality of content which is image processed by the plurality of first scalers.

7. The electronic device of claim 6, wherein the size information comprises at least one from among resolution information, HDR information, high-bandwidth digital content protection (HDCP) information, color gamut information, or frame rate information.

8. The electronic device of claim 1, wherein the request for simultaneously displaying the plurality of content comprises a user request for displaying the plurality of content in a picture by picture (PBP) form.

9. The electronic device of claim 1, wherein the processor is configured to:
change, based on the request for simultaneously displaying the plurality of content being received and the information on whether to support HDR of the plurality of content being different, the information on whether to support HDR of the at least one scaler among the plurality of scalers.

10. The electronic device of claim 1, wherein the electronic device and each of the plurality of source devices are connected to a size of High-Definition Multimedia Interface (HDMI) 2.1.

11. A control method of an electronic device, the control method comprising:
receiving a plurality of content from a plurality of source devices; and
changing, based on a request for simultaneously displaying the plurality of content being received, information on whether to support high dynamic range (HDR) of at least one scaler among a plurality of scalers comprised in the electronic device.

12. The control method of claim 11, wherein the information on whether to support HDR is comprised in Extended Display Identification Data (EDID) information of a corresponding scaler among the plurality of scalers.

13. The control method of claim 12, wherein the changing comprises:
changing the information on whether to support HDR of at least one scaler among the plurality of scalers to an HDR unsupported state.

14. The control method of claim 13, further comprising:
transmitting updated EDID information of each of the plurality of scalers to a corresponding source device among the plurality of source devices by changing to the HDR unsupported state.

15. The control method of claim 12, wherein the EDID information is stored in an internal memory of the plurality of scalers respectively, or stored in an external memory outside of the plurality of scalers.

* * * * *